INVENTOR.
JUSTIN A. DEUBEL
BY Tate + Weikart
ATTORNEYS

Oct. 28, 1952  J. A. DEUBEL  2,615,508
CYCLIC CONTROL SYSTEM FOR BURNERS
OR OTHER CONDITION CHANGERS
Filed July 29, 1950  3 Sheets-Sheet 3

INVENTOR.
JUSTIN A. DEUBEL
BY
Tate & Weikart
ATTORNEYS

Patented Oct. 28, 1952

2,615,508

UNITED STATES PATENT OFFICE 2,615,508

CYCLIC CONTROL SYSTEM FOR BURNERS OR OTHER CONDITION CHANGERS

Justin A. Deubel, Milwaukee, Wis., assignor to Perfex Corporation, Milwaukee, Wis., a corporation of Wisconsin Application July 29, 1950, Serial No. 176,704

5 Claims. (Cl. 158—28)

1

This invention relates generally to control apparatus for a condition changer and more particularly to an arrangement of control components, including a timer motor, for maintaining a proper sequence of operation for an igniter and a fuel burner which are automatically controlled by an external condition responsive device, such as a space thermostat located in the space to be heated.

Control apparatus for certain automatic heating installations, particularly oil burners, are required to provide a sequence of operation for the fuel supplying means or oil valve and igniter which will insure safe and satisfactory performance of the heating plant. Since all of several malfunctions of the heating plant or power supply such as ignition failure, power failure, etc. must be anticipated, the control apparatus often must take the form of an assemblage of rather complicated and delicate components. For certain heating installations such as those on trucks or busses wherein the control apparatus is subject to prolonged vibration and repeated jarring, the rugged control apparatus necessary may be provided by an assemblage of components which includes a timing motor for providing the proper operation sequence, rather than the more delicate components previously referred to.

An object of this invention is to provide a motorized control apparatus which provides a proper operational sequence for a device to be controlled and is of rugged, trouble-free construction.

A further object is to provide a motorized control apparatus for a heating plant which provides for emergency shut-down of the heating plant when certain malfunctions occur.

A further object is to provide a motorized control apparatus which, during a starting period, checks the operation of a combustion responsive switch which is integrated into the control system, and either proceeds to an emergency shutdown position or proceeds with the normal operating sequence, depending upon the position of the combustion responsive switch.

A further object is to provide a motorized control apparatus which, after a starting period and upon the initiation of a normal running period of the heater, operates to deenergize itself leaving the heater to operate under the control of an external condition responsive device such as a space thermostat.

Other objects and advantages will become apparent from the following description and accompanying drawings in which:

2

Figure 1:
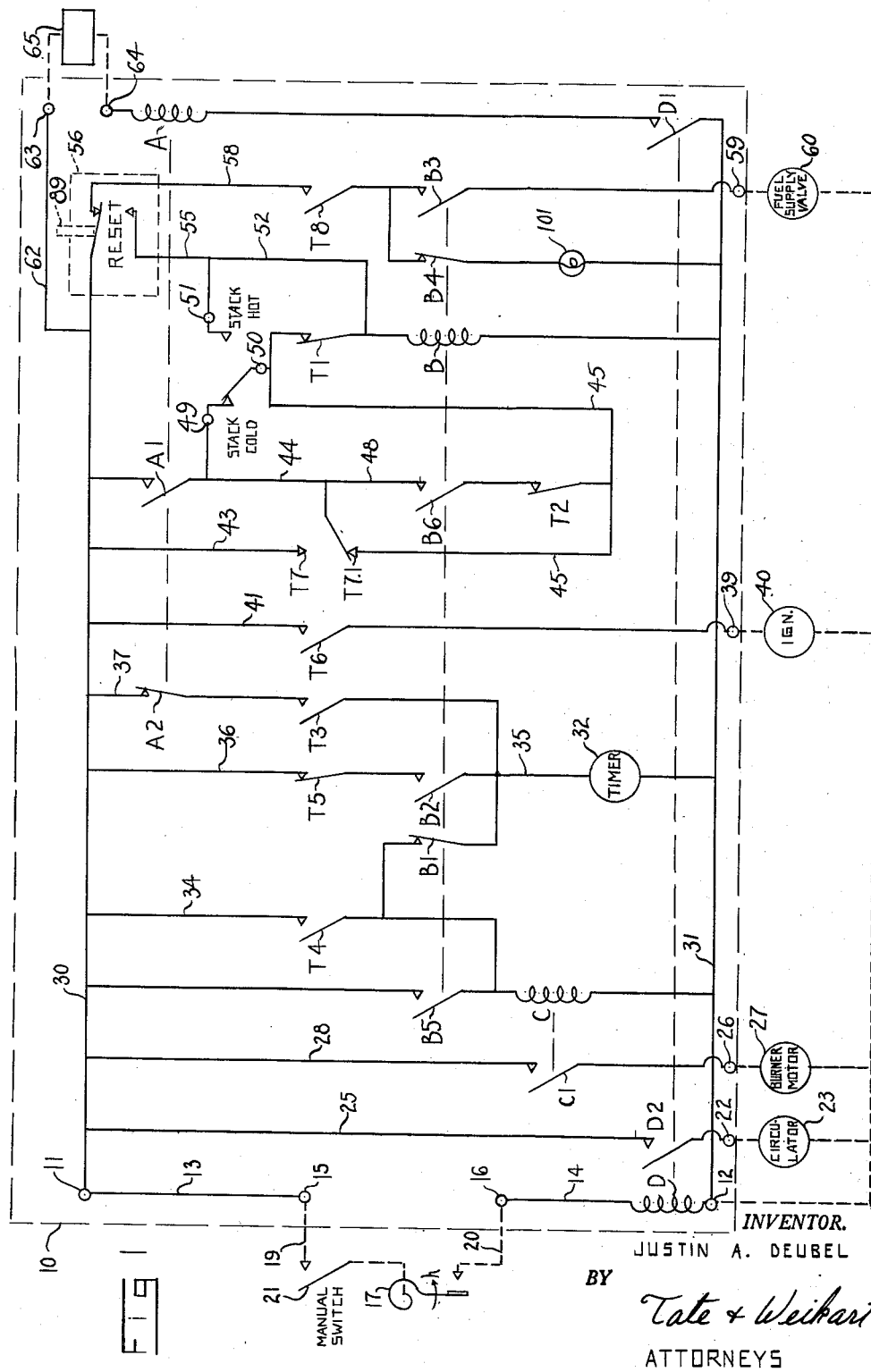
Fig. 1 is a schematic representation of the control apparatus and the operating elements which it controls.

Referring to Fig. 1, the numeral 10 designates a panel, which for clarity is outlined with broken lines, upon which are mounted the various components making up the control apparatus and the terminals for connecting them into a control system. Power input terminals 11 and 12 may be connected to a suitable source of power, and when so connected provide an energizing circuit for an auxiliary relay D through the conductors 13 and 14. These conductors 13 and 14 are connected to the terminals 15 and 16, to which an external condition responsive member, such as the space thermostat 17 may be connected by means of external leads 19 and 20 and manual switch 21. It will be understood that external leads 19 and 20 enable location of the thermostat 17 in the space the temperature of which is to be controlled, which location may be at a point remote from the control apparatus.

Terminal 22 provides a connection for a circulator 23 which may take the form of a fan or a pump depending upon the heating medium being used. The energizing circuit 25 for the terminal 22 is controlled by the normally open relay switch D2.

The terminal 26 provides a connection for a means for supplying fuel and combustion air, such as the burner motor 27. The energizing circuit 28 for the terminal 26 is controlled by a normally open relay switch C1, which is closed upon energization of an auxiliary relay C, to be presently described.

Internally connected across the terminals 11 and 12 by means of conductors 30 and 31 is an auxiliary relay C, the circuit of which is controlled by either the relay switch B5 (which is moved to closed position upon energization of a main relay B to be presently described) or by a timer-operated switch T4, closure of either switch serving to energize relay C.

A timing motor 32 has alternate energizing circuits composed of three branches, the first of which includes conductor 34, switch T4, normally closed relay switch B1 and conductor 35. A second branch includes conductor 36, timer-operated switch T5, normally open relay switch B2 and conductor 35. The third branch includes conductor 37, relay switch A2 (which is opened upon energization of an auxiliary relay A to be presently described), timer-operated switch T3 and conductor 35.

Terminal 39 provides a connection for an ignition means 40, which may take the form of an ignition transformer and electrodes where spark-ignition is used. The energizing circuit 41 for the terminal 39 is controlled by a timer-operated switch T6.

The main relay B has an energizing circuit composed of a circuit network including conductor 43, one side, T7, of a double-throw, timer-operated switching means, a shunt circuit for the switch T7 including relay switch A1, conductor 44 and the common switch arm of the double-throw switching mechanism. This common switch arm in the position shown connects with the other side T7.1 of the double-throw switching mechanism said other side being connected to main relay B through conductor 45 and timer-operated switch T1. Conductor 48, normally open; relay-operated switch B6 and timer-operated switch T2 connect the conductors 44 and 45 and provide a parallel circuit around the timer switch T7.1.

Terminals 49, 50 and 51 connected to conductors 44, 45 and 52 respectively, provide three connecting terminals for an external, double-throw condition responsive switching means which may take the form of a stack temperature or combustion responsive switch having a starting or cold position at which a circuit between terminals 49 and 50 is established and a running or hot position at which a circuit between terminals 50 and 51 is closed. It will be noted that with a circuit closed between terminals 49 and 50, as shown in Fig. 1, an additional circuit is established between conductors 44 and 45 which is in parallel to the circuit through switch T7.1 and to the circuit through relay-operated switch B6 and timer-operated switch T2. When the external stack switch is in its hot positoin, establishing a circuit between terminals 50 and 51, it will be noted that a circuit is established to main relay B independently of the timer-operated switch T1. It will be understood that the combustion responsive switching means connected to the terminals 49, 50, and 51 will be located near the location of the burner itself, which location may be remote from the control apparatus.

A conductor 55 connects the conductor 52 to one side of a manually operated, double-throw switch 56. The common terminal of this switch 56 is connected to conductor 30.

The other contact of the switch 56 is connected to a timer-operated switch T8 and a relay-operated switch B3 by means of a conductor 58. These last-mentioned switches provide a circuit to a terminal 59.

Terminal 59 provides a connection for a fuel supplying means which may take the form of a solenoid fuel supply valve 60. This valve is, of course, located near the burner, at a point which may be remote from the control apparatus.

A conductor 62 connects conductor 30 with a terminal 63. A terminal 64 is connected to an auxiliary relay A whose energizing circuit is controlled by a relay switch D1, moveable to closed position upon energization of auxiliary relay D. Terminals 63 and 64 serve as connections for an external heating medium responsive means, which may take the form of a thermostat 65, responsive to water temperature when the heating system is one which utilizes water as the heat-exchange medium. The thermostat 65 will, of course, be located at a point remote from the terminals 63 and 64 and the control apparatus.

Figure 2:
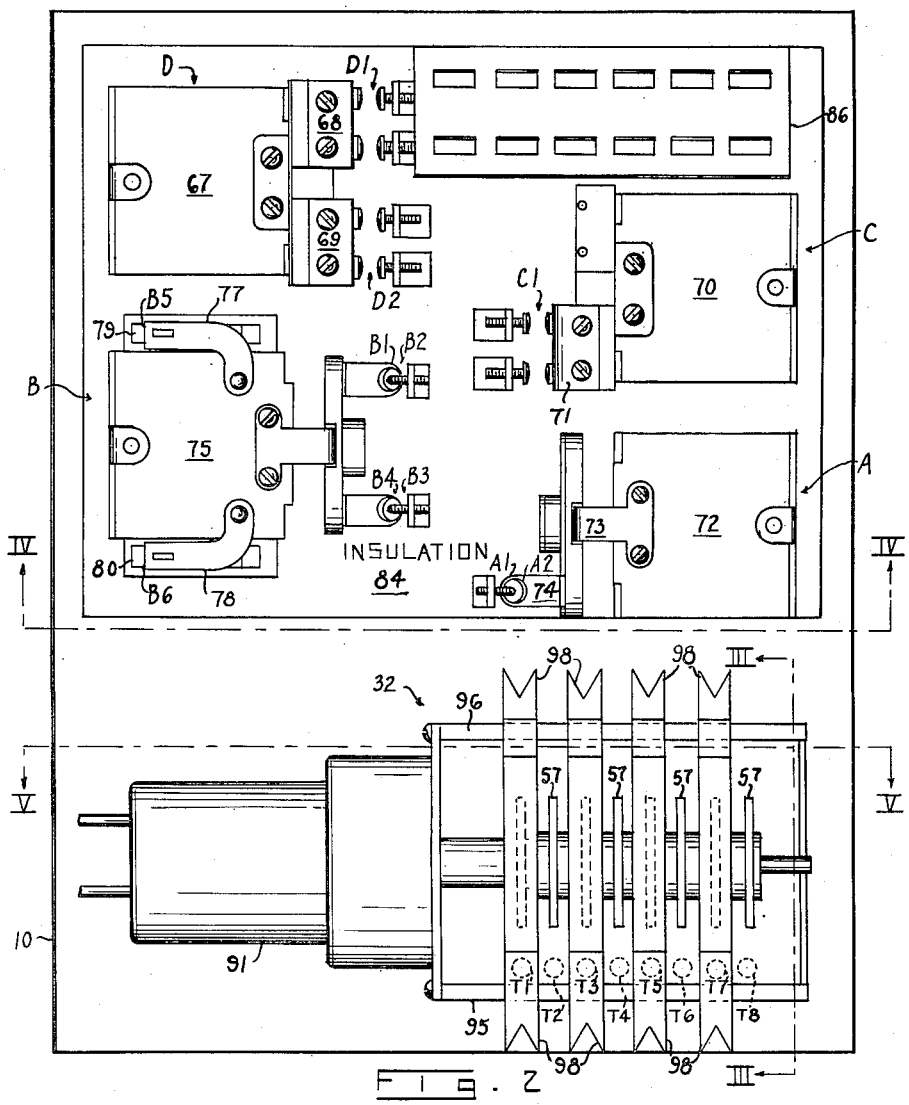
Fig. 2 is a top view of the control apparatus.

Referring now to Fig. 2, where is shown the control apparatus represented schematically in Fig. 1, it will be noted that the armature 67 of relay D carries the bridging contact structures 68 and 69 which serve to bridge, when the relays are energized, the adjacent fixed contacts to thereby constitute the relay switches D1 and D2, respectively.

Similarly, the armature 70 of the relay C carries the bridging contact structure 71 which serves to bridge the adjacent fixed contacts, when the relay C is energized, to thereby constitute the relay switch C1.

Figure 4:
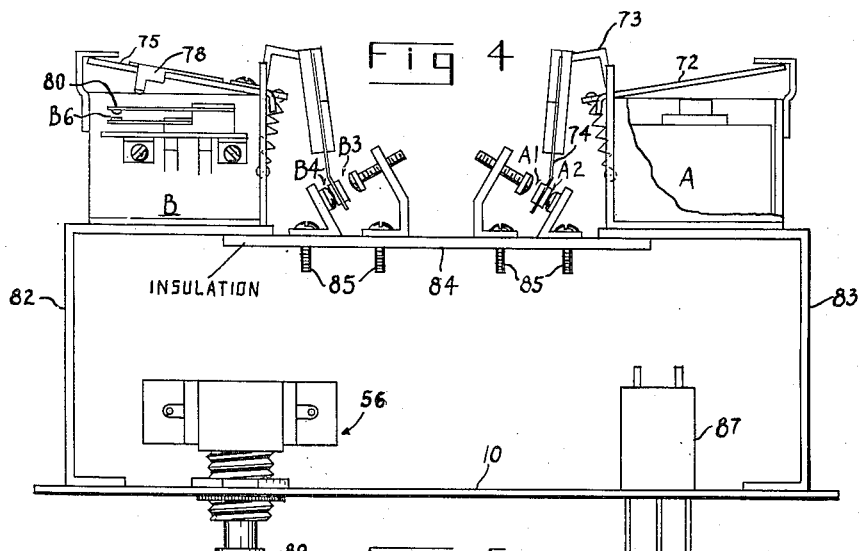
Fig. 4 is a sectional view of the control apparatus taken generally along the line IV—IV of Fig. 2, showing certain of the relays and their associated switching elements.

Referring now to Figs. 2 and 4, it will be noted that the armature 72 of the relay A carries a contact mounting member 73 on which is supported a flexible blade 74. Blade 74 carries moveable contacts which cooperate with adjacent fixed contacts to form the relay switches A1 and A2.

Similarly, the armature 75 of main relay B carries moveable contacts which cooperate with adjacent fixed contacts to form the relay-operated switches B1, B2, B3 and B4. Additionally, the armature 75 of relay B carries side-arm members 77 and 78 which cooperate with the flexible spring members 79 and 80 respectively. Members 79 and 80 and adjacent contact carrying blades form the relay-operated switches B5 and B6 which are closed upon energization of relay B.

It will be noted that the relays A, B, C, and D, as shown in Fig. 4, are mounted on brackets 82 and 83 which are carried by the panel 10. A sub-panel 84 formed of suitable insulating material is secured to adjacent legs of brackets 82 and 83. Panel 84 serves as a mounting for the fixed contacts of the relay switches. Wiring connections (not shown) may be made to the fixed contacts by means of the screws 85 extending through the panel 84.

As shown in Figs. 2 and 4 respectively, a multiple connector receptacle 86 and a multiple connector plug 87 are mounted on the panel 10. Receptacle 86 and plug 87 form the connecting terminals referred to in the description of Fig. 1. For purposes of clarity the wiring connecting the control apparatus components, including receptacle 86 and plug 87, has been omitted from Figs. 2, 3, 4 and 5.

As may be seen in Fig. 4 the reset switch 56 is mounted on the panel 10 and has its manual operating pin 89 extending through the panel 10.

Figure 3:
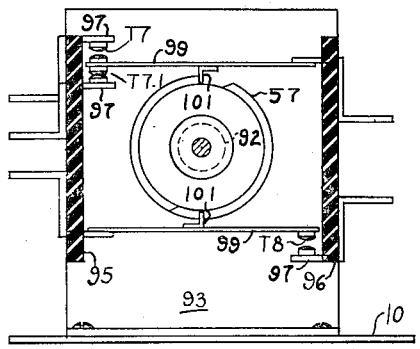
Fig. 3 is an end view of the timer and its associated switching elements viewed from the position of line III—III of Fig. 2.
Figure 5:
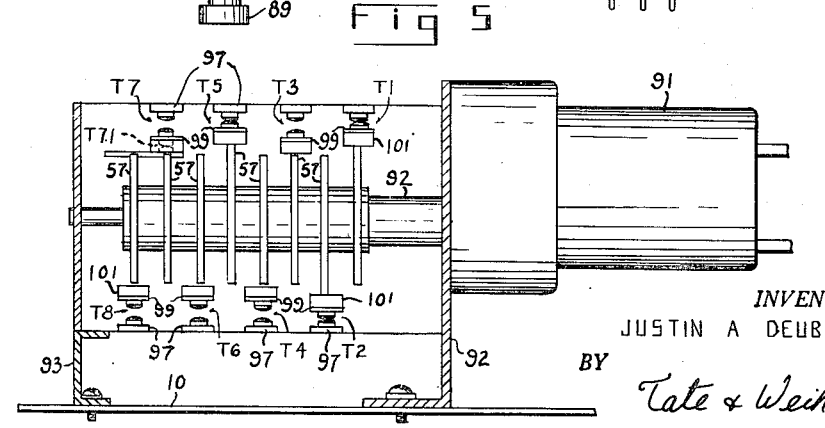
Fig. 5 is a sectional view of the control apparatus taken generally along the line V—V of Fig. 2, showing the timer and its associated switching elements.

Referring to Figs. 2, 3, and 5, the timer 32 includes a timer motor 91, mounted on a bracket 92 (Fig. 5), which is in turn mounted on the panel 10. The motor 91 has a shaft 92 upon which are mounted the cams for operation of the timer switches. A bracket 93 mounted on panel 10 serves as an end plate for the timer switch assembly and carries a bearing for supporting shaft 92.

The timer switch assembly includes side pieces 95 and 96 which have mounted thereon fixed contact carrying members 97. Members 97 have extending portions 98 which serve as lugs for attaching connecting wiring (not shown). Cooperating with members 97 are flexible blades 99 carrying moveable contacts which, with the fixed contacts form the timer-operated switches. As may best be seen in Fig. 5, the switches T1, T3, T5, T7 and T7.1 are located at the top of the switch assembly while the switches T2, T4, T6 and T8 are mounted at the bottom of the switch assembly.

The switches T7 and T7.1 are formed by a double-throw switch assembly as may best be seen in Fig. 3. It will be noted that each of the blades 99 carries a cam follower 101 which engages the appropriate cam 57.

*Operation*

Figure 6:
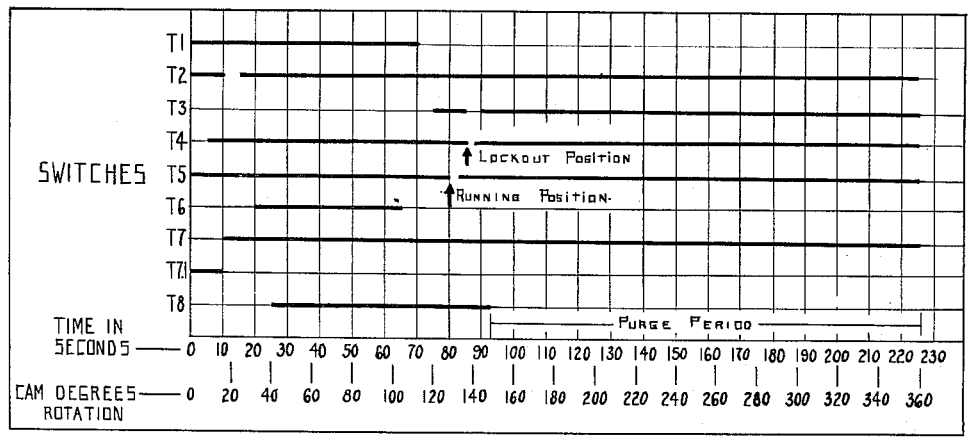
Fig. 6 is a chart showing the sequence of operation of the timer operated switches.

Referring now to Figs. 1 and 6, it will be noted that with the manual switch 21 open the relay D is in deenergized position, relay switch D1 is open, and relay A is deenergized. Relay switch A1 is consequently in open position, and main relay B is deenergized. The timer motor is deenergized since its initial starting circuit through switch T5 and switch B2 is broken at B2. The circulator 23, burner motor 27, igniter 40 and fuel supply valve 60 are all deenergized.

To initially start the heating plant the manual switch 21 is closed. Assuming that the space to be heated is cooled below the temperature at which the thermostat 17 is closed, a circuit will be established between the terminals 15 and 16 completing the circuit to relay D. Energization of relay D closes the switch D2, which immediately starts the circulator 23. Closure of switch D1 completes a portion of the energizing circuit to the relay A. Assuming that the temperature of the heating medium is below the temperature at which the heating medium responsive device 65 is closed, relay A will be energized. Energization of relay A closes relay switch A1 and opens relay switch A2. Opening of switch A2 has no effect at this time upon the timer circuit in which it is located. Closing of switch A1 completes an initial energizing circuit to main relay B through conductor 44, timer operated switch T7.1, conductor 45, and switch T1. Energization of relay B closes switch B3 and opens switch B4; operation of these switches has no effect at this time since the timer-operated switch T8 is open. Energization of relay B also closes switches B5 and B6, closure of switch B5 establishes an energizing circuit for relay C closing the switch C1 which thereupon starts the delivery of combustion supporting air by placing the burner motor 27 into operation. Closure of switch B6 completes a circuit around the switch T7.1 through the conductor 48 and timer-operating switch T2. Energization of relay B additionally opens switch B1 and closes switch B2. Opening of switch B1 has no effect at this time upon the timer circuit. Closure of switch B2, however, completes an initial energizing circuit to timer 32 through conductor 36, timer-operated switch T5, switch B2 and conductor 35. Timer motor 32 thereupon begins to move away from its starting position and to operate the timer-operated switches in the sequence shown in Fig. 6.

Referring to Fig. 6, approximately five seconds after the timer 32 starts, the switch T4 will be closed. T4 may be termed a lockout switch, and its closure early in the starting cycle insures that although the relay B should be deenergized thereafter, a circuit to the timer motor will exist through switch T4 so that the timer 32 will move to its lockout or safety position.

After ten seconds following the start of the timer 32 the switch T7.1 is open and switch T2 is opened for a period of five additional seconds and then reclosed, also switch T7 is closed. Opening of switches T7.1 and T2 serves to make continued energization of main relay B dependent on a circuit through terminals 49 and 50. If the external combustion responsive switching means is in its starting or cold position (as shown in Fig. 1), relay B will remain energized for the five second intervals during which switch T2 is open. Reclosure of switch T2 again establishes a circuit for relay B through switch B6 and switch T2. Closure of switch T7 establishes a circuit to relay B which is independent of relay switch A1, thereby insuring that the timer 32 will proceed through its normal sequence of operation even though the control 65 or the thermostat 17 should reopen.

Approximately twenty seconds following the starting of the timer motor the switch 76 is closed energizing the igniter. Twenty-five seconds after the starting of timer 32 switch T8 closes, energizing the fuel supply valve 60 through conductor 58, switch T8 and switch B3 which is at that time, as previously pointed out, in closed position. Since the igniter 40 is now energized and fuel is being delivered through the fuel supply valve 60, under normal circumstances, combustion will occur and will shortly thereafter move the combustion responsive switching means from its cold position to its running or hot position. This will break the circuit through terminals 49 and 50 and will complete a circuit through terminals 50 and 51. Opening of the circuit through terminals 49 and 50 will have no effect upon relay B since it is maintained energized through conductor 48, switch B6, and switch T2. Completing the circuit through terminals 50 and 51 has no immediate effect; it merely establishes a circuit to relay B in parallel with switch T1.

Sixty-five seconds after the starting of timer 32 the switch T6 is opened which breaks the energizing circuit to terminal 39 and consequently to the igniter 40.

Seventy seconds after the starting of timer 32 switch T1 is opened. Relay B will, however, remain energized through terminals 50 and 51 and the combustion responsive switching means which, as previously pointed out, will have moved to its hot position.

Seventy-five seconds after the starting of timer 32 the switch T3 is closed. Closure of switch T3 has no immediate effect, however, it does place the timer circuit back under control of relay A. It will be noted that early in the timer cycle the timer-operated switch T7 was closed which shunted the relay switch A1 and made continued energization of the relay B and consequently timer 32 independent of the condition of relay A. Closure of switch T3 prepares a circuit to timer 32 through conductor 37 and relay switch A2. From this point on in the operating cycle, deenergization of relay A and consequently closing of switch A2, brought about either by opening of manual switch 21, thermostat 17, or control 65 will cause timer 32 to proceed to a shut-down position.

Eighty seconds after the starting of timer 32, the switch T5 is opened, breaking the energizing circuit to timer 32. Timer 32 thereupon stops with the timer-operated switches in running position, i. e., with the circulator 23, burner motor 27, and fuel supply valve 60 all energized and with the igniter and timer motor deenergized.

Under normal conditions combustion continues until the opening of thermostat 17 or control 65 deenergizes relay A. As previously mentioned, deenergization of relay A and the consequent closure of switch A2 establishes a circuit to the timer 32 through conductor 37, switch A2 and timer switch T3. Timer 32 is thereupon reenergized and proceeds through a purge period during which both the control apparatus and the combustion chamber are prepared for the next operating cycle. Approximately three seconds after timer 32 has restarted switch T5 is reclosed providing an additional circuit to timer 32 through conductor 36, switches T5 and B2.

Within a few seconds after the reclosing of switch T5, both switches T3 and T4 open for short intervals. Since under normal conditions, there is a circuit to timer 32 through switches T5 and B2, the momentary opening of switches T3 and T4 has no effect. This opening of switch T4 does, however, under abnormal conditions, define a lockout position of the timer 32, as will subsequently be explained.

In approximately ten seconds after the timer 32 has restarted, switch T8 is opened breaking the circuit to terminal 59 and consequently closing fuel supply valve 60. The burner motor 27 continues to run and the air thereby blown through the combustion chamber serves to purge it preparatory for the next burner operation.

As indicated in Fig. 6 this purge period lasts for approximately two minutes. During this period the combustion responsive switching means will move from its hot or running position to its cold or starting position, whereupon the main relay B will be deenergized. At the end of the purge period switches T3, T4 and T7 open simultaneously. Opening of switches T3 and T4 break the energizing circuit to timer 37 which thereupon stops with the timer-operated switches back in starting position. Opening of switch T7 makes reenergization of main relay B dependent on the closure of switch A1 which will occur to start off the next burner operation upon closure of thermostat 17. Reclosure of switch T7.1 sets up a circuit to main relay B which is utilized at the beginning of the next operating cycle, as previously pointed out.

*Abnormal operation:*

Should a momentary electrical power failure occur early in the starting cycle, before the combustion responsive means has moved from its cold to its hot position, the control apparatus will be reenergized upon the restoration of power and the timer 32 will proceed with the starting cycle.

If a momentary power failure should occur too late in the starting cycle to enable the combustion responsive switching means to move to its hot position before switch T1 is opened, when switch T1 is opened the relay B will be deenergized. The timer 32, however, will remain energized through conductor 34, switch T4 and switch B1. The timer will operate until switch T4 is opened which defines a lockout position for the timer 32. At this lockout position the main operating circuit controlled by relay B, including relay C, timer 32, burner motor 27, ignition 40 and fuel supply valve 60 is deenergized, and since switches T8 and B4 are closed and switch B3 is open, the fuel supply valve 60 will be closed but the lockout indicating light 101 will be lit indicating that the control apparatus has moved to lockout position. To reset the control apparatus to starting position the switch button 89 of the reset switch 56 must be depressed, closing a circuit to relay B through conductors 55 and 52. Energization of relay B and consequent closing of switch B2 restarts the timer 32 which operates through the purge period back to starting position. If the defect which caused the timer to move to lockout position has been remedied, the control will proceed through a normal starting and running period. It will be noted that when the reset switch 56 is actuated, the normally-closed contacts are opened. This insures that the circuit to fuel supply valve 60 cannot be closed to start oil flow while reset switch 56 is actuated, thereby preventing the heating equipment attendant from taping down manual operating button 89 to operate the control apparatus with the combustion responsive switching means removed from the energizing circuit of relay B.

In the event of ignition failure since the combustion responsive switching means does not move to its hot position to close the circuit between terminals 50 and 51, when switch T1 opens, the contact to relay B will be broken. The consequent closure of switch B1 in the circuit to timer 32 will provide an energizing circuit which will maintain timer 32 operating until it reaches lockout position defined by the opening of switch T4. The relay B and timer 32 can be reenergized, with timer 32 moving through the purge period to its starting position, by actuating reset switch 56 as previously pointed out.

In the event of combustion failure during a running period, the combustion responsive means will, of course, after a short while, cool and move from its hot position to its cold position, thereby opening the circuit between terminals 50 and 51. Opening of this contact deenergizes relay B; the consequent closing of switch B1 completes a circuit to timer 32 through the closed switch T4. Timer 32 will thereupon be reenergized and cause to move to lockout position defined by the opening of switch T4 as previously pointed out.

It will be noted that the relay B, controlling the energization of timer 32, is initially energized through the switch T7.1 which shortly thereafter is opened to make continued energization of relay B dependent upon closure of switches B6 and T2. Switch T2 is momentarily opened making continued energization of relay B dependent on the combustion responsive switching means being in its cold position. Thus at the start of each cycle the position of the combustion responsive switching means is checked to determine whether it had moved to its cold position at the end of the preceding operating cycle. Failure of the combustion responsive switching means in its hot position will thus cause a lockout of the control apparatus at the start of the next operating cycle.

From the foregoing it will be evident that the control apparatus described provides a sequence of operation wherein the control apparatus moves to an emergency shut-down, or lockout, position upon a momentary power failure, ignition failure, or combustion failure, and either proceeds to an emergency shut-down position or continues with a normal operating sequence depending upon the position of a combustion responsive switching means at the start of the operating period.

In light of the foregoing description it will be apparent that modifications of this invention are possible, however; the invention is thereby limited only by the scope of the appended claims.

What is claimed is:

1. Control apparatus for controlling a condition changer, said apparatus having power input terminals for supplying power to the control apparatus, first and second terminals adapted to be electrically joined by an external condition responsive member, third fourth and fifth terminals adapted to be controlled by an external condition responsive switching means having a starting position wherein said third and fourth terminals are adapted to be electrically joined and a running position wherein said fourth and fifth terminals are adapted to be electrically joined, a sixth terminal adapted to be connected to said condition changer to supply power thereto, said control apparatus comprising; a timer, a relay, switching means operated by said timer, switching means operated by said relay a portion thereof being in control of energization of said timer, a starting circuit for said relay including first and second normally closed timer-operated switches adapted to be controlled by a circuit through said first and second terminals, a holding circuit for said relay in parallel with said first timer-operated switch including a third normally closed timer operated switch and a normally open relay-operated switch, an additional holding circuit in parallel with said first timer-operated switch including said third and fourth terminals, a running circuit for said relay including said normally open relay-operated switch said third timer-operated switch and said fourth and fifth terminals, a fourth timer-operated switch in circuit with one of said power input terminals and said sixth terminal to control energization of said switch terminal, said timer operating to open said first timer-operated switch after initial energization of said relay, thereafter momentarily opening said third timer-operated switch so that continued energization of said relay momentarily depends upon a closed circuit between said third and fourth terminals thereby checking the position of said external condition responsive switching means, thereafter closing said fourth timer-operated switch and energizing said sixth terminal and consequently said condition changer, and finally opening said second timer-operated switch making continuing energization of said relay depend on said running circuit through said fourth and fifth terminals.

2. Control apparatus for controlling a condition changer, said apparatus having power input terminals for supplying power to the control apparatus, first and second terminals adapted to be electrically jointed by an external condition responsive member, third fourth and fifth terminals adapted to be controlled by an external condition responsive switching means having a starting position wherein said third and fourth terminals are adapted to be electrically joined and a running position wherein said fourth and fifth terminals are adapted to be electrically joined, a sixth terminal adapted to be connected to said condition changer to supply power thereto, said control apparatus comprising: a timer, a relay, switching means operated by said timer, switching means operated by said relay including a normally open timer-controlling switch, an initially closed timer-controlling switch operated by said timer, an energizing circuit for said timer jointly controlled by both said timer-controlling switches, a starting circuit for said relay including first and second normally closed timer-operated switches adapted to be controlled by a circuit through said first and second terminals, a holding circuit for said relay in parallel with said first timer-operated switch including a third normally closed timer-operated switch and a normally open relay-operated switch, an additional holding circuit in parallel with said first timer-operated switch including said normally open relay-operated switch said third timer-operated switch and said fourth and fifth terminals, a fourth timer-operated switch in circuit with one of said power input terminals and said sixth terminal to control energization of said sixth terminal, said timer operating to open said first timer-operated switch after initial energization of said relay, thereafter momentarily opening said third timer-operated switch so that continued energization of said relay momentarily depends upon a closed circuit between said third and fourth terminals thereby checking the position of said external condition responsive switching means, thereafter closing said fourth timer-operated switch and enrgizing said sixth terminal and consequently said condition changer, thereafter opening said second timer-operated switch making continuing energization of said relay depend on said running circuit through said fourth and fifth terminals, and finally opening said initially closed timer-controlling switch operated by said timer to thereupon deenergize said timer.

3. Control apparatus for controlling a condition changer, said apparatus having power input terminals for supplying power to the control apparatus, first and second terminals adapted to be electrically joined by an external condition responsive member, third fourth and fifth terminals adapted to be controlled by an external condition responsive switching means having a starting position wherein said third and fourth terminals are adapted to be electrically joined and a running position wherein said fourth and fifth terminals are adapted to be electrically joined, a sixth terminal adapted to be connected to said condition changer to supply power thereto, said control apparatus comprising: a timer, a relay, switching means operated by said timer, switching means operated by said relay including a normally open timer-controlling switch, an initially closed timer-controlling switch operated by said timer, a circuit for said timer jointly controlled by both said timer-controlling switches, a circuit from one of said power input terminals to said sixth terminal jointly controlled by said timer and said relay, a starting circuit for said relay including first and second normally closed timer-operated switches adapted to be controlled by a circuit through said first and second terminals, a holding circuit for said relay in parallel with said first timer-operated switch including a third normally closed timer-operated switch and a normally open relay-operated switch, an additional holding circuit in parallel with said first timer-operated switch including said normally open relay-operated switch, said third timer-operated switch and said fourth and fifth terminals, said timer operating to open said first timer-operated switch after initial energization of said relay, thereafter momentarily opening said third timer-operated switch so that continued energization of said relay momentarily depends upon a closed circuit between said third and fourth terminals thereby checking the position of said external condition responsive switching means, thereafter energizing said sixth terminal and consequently said condition changer, thereafter opening said second timer-operated switch making continuing energization of said relay depend on said running circuit through said fourth and fifth terminals, and finally opening said initially closed timer-controlling switch operated by said timer to thereupon deenergize said timer, making continued energization of said sixth terminal and consequently said condition changer depend upon continued energization of said relay.

4. Control apparatus for controlling a condition changer, said apparatus having power input terminals for supplying power to the control apparatus, first and second terminals adapted to be electrically joined by an external condition responsive member, third, fourth and fifth terminals adapted to be controlled by an external condition responsive switching means having a starting position wherein said third and fourth terminals are adapted to be electrically joined and a running position wherein said fourth and fifth terminals are adapted to be electrically joined, a sixth terminal adapted to be connected to said condition changer to supply power thereto, said control apparatus comprising: a timer having starting, running, and lockout positions; a relay, switching means operated by said timer, switching means operated by said relay including a normally open timer-controlling switch, an initially closed timer-controlling switch operated by said timer, an energizing circuit for said timer jointly controlled by both said timer-controlling switches, a starting circuit for said relay including first and second normally closed timer-operated switches adapted to be controlled by a circuit through said first and second terminals, a holding circuit for said relay in parallel with said first timer-operated switch including a third normally closed timer-operated switch and a normally open relay-operated switch, an additional holding circuit in parallel with said first timer-operated switch including said normally open relay-operated switch said third timer-operated switch and said fourth and fifth terminals, a fourth timer-operated switch in circuit with one of said power input terminals and said sixth terminal to control energization of said sixth terminal, said timer operating to open said first timer-operated switch after initial energization of said relay, thereafter momentarily opening said third timer-operated switch so that continued energization of said relay momentarily depends upon a closed circuit between said third and fourth terminals thereby checking the position of said external condition responsive switching means, thereafter closing said fourth timer-operated switch and energizing said sixth terminal and consequently said condition changer, thereafter opening said second timer-operated switch making continuing energization of said relay depend on said running circuit through said fourth and fifth terminals, and finally opening said initially closed timer-controlling switch operated by said timer to thereupon deenergize said timer and define said timer running position, and a lockout circuit including a timer-operated switch and a normally closed relay-operated switch, said lockout circuit being arranged in parallel to said timer energizing circuit and operable to energize said timer to move from said running position to said lockout position whenever said relay is deenergized while the timer is in said running position.

5. Control apparatus for controlling an oil burner fuel supplying means, said apparatus having power input terminals for supplying power to the control apparatus, first and second terminals adapted to be electrically joined by an external thermostat, third, fourth and fifth terminals adapted to be controlled by external switching means responsive to the temperature of combustion and having a cold position wherein said third and fourth terminals are electrically joined and a hot position wherein said fourth and fifth terminals are electrically joined, a sixth terminal adapted to be connected to said fuel supplying means to supply power thereto, said control apparatus comprising: a timer, a relay, switching means operated by said timer, switching means operated by said relay including a normally open timer-controlling switch, an initially closed timer-controlling switch operated by said timer, a circuit for said timer jointly controlled by both said timer-controlling switches, a circuit from one of said power input terminals to said sixth terminal jointly controlled by said timer and said relay, a starting circuit for said relay including first and second normally closed timer-operated switches adapted to be controlled by a circuit through said first and second terminals, a holding circuit for said relay in parallel with said first timer-operated switch including a third normally closed timer-operated switch and a normally open relay-operated switch, an additional holding circuit in parallel with said first timer-operated switch including said normally open relay-operated switch, said third timer-operated switch and said fourth and fifth terminals, said timer operating to open said first timer-operated switch after initial energization of said relay, thereafter momentarily opening said third timer-operated switch so that continued energization of said relay momentarily depends upon a closed circuit between said third and fourth terminals thereby checking the position of said external switching means responsive to the temperature of combustion, thereafter energizing said sixth terminal and consequently energizing said fuel supplying means, thereafter opening said second timer-operated switch making continuing energization of said relay depend on said external combustion responsive switching mechanism remaining in its hot position, and finally opening said initially closed timer-controlling switch operated by said timer to thereupon deenergize said timer making continued energization of said sixth terminal and consequently of said fuel supplying means depend upon continued energization of said relay.

JUSTIN A. DEUBEL.

REFERENCES CITED

The following references are of record in the file of this patent:

UNITED STATES PATENTS

| Number | Name | Date |
|---|---|---|
| 2,102,618 | Francis | Dec. 21, 1937 |
| 2,136,235 | Crago | Nov. 8, 1938 |
| 2,388,666 | Bower | Nov. 13, 1945 |
| 2,537,291 | Wilson | Jan. 9, 1951 |